UNITED STATES PATENT OFFICE.

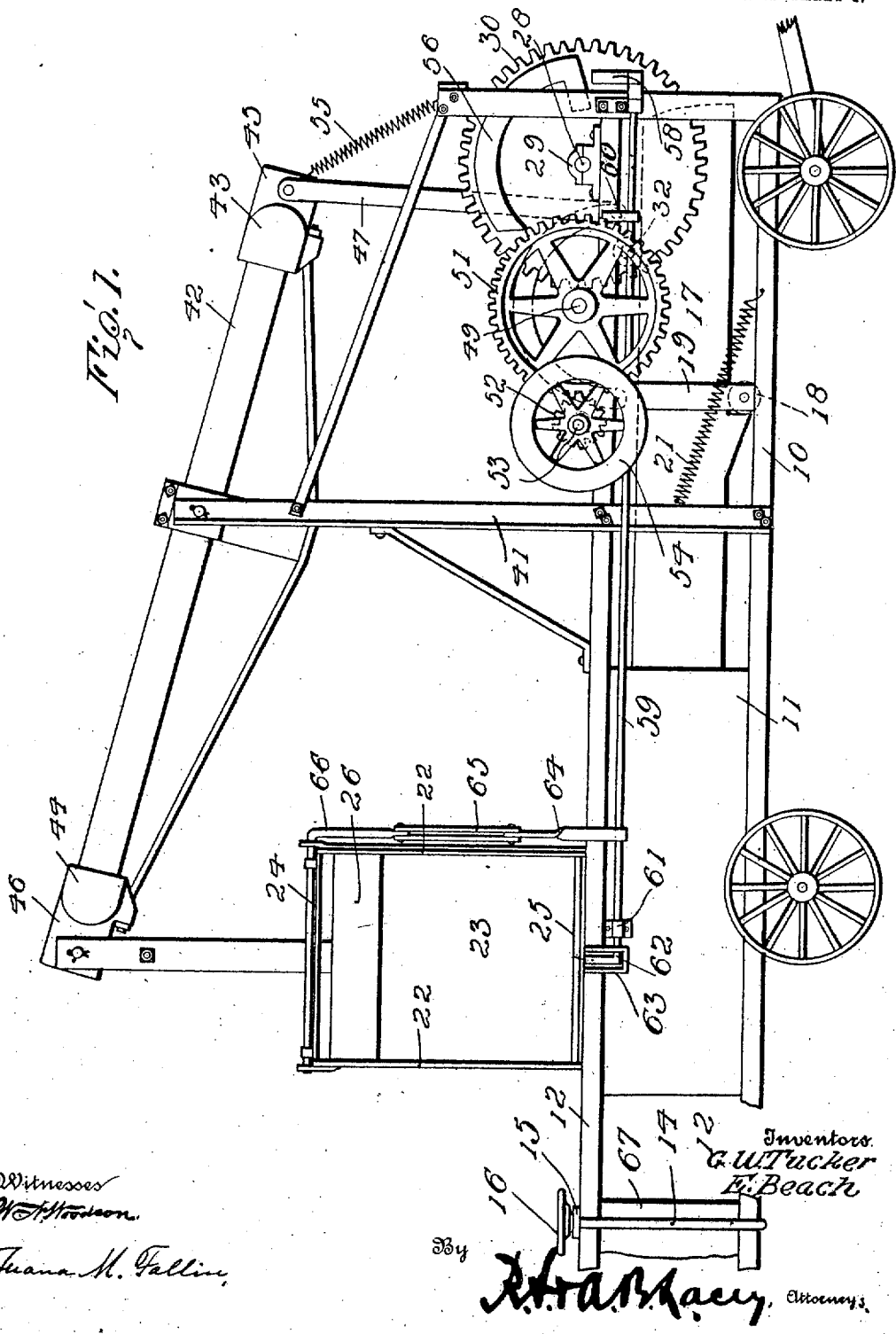

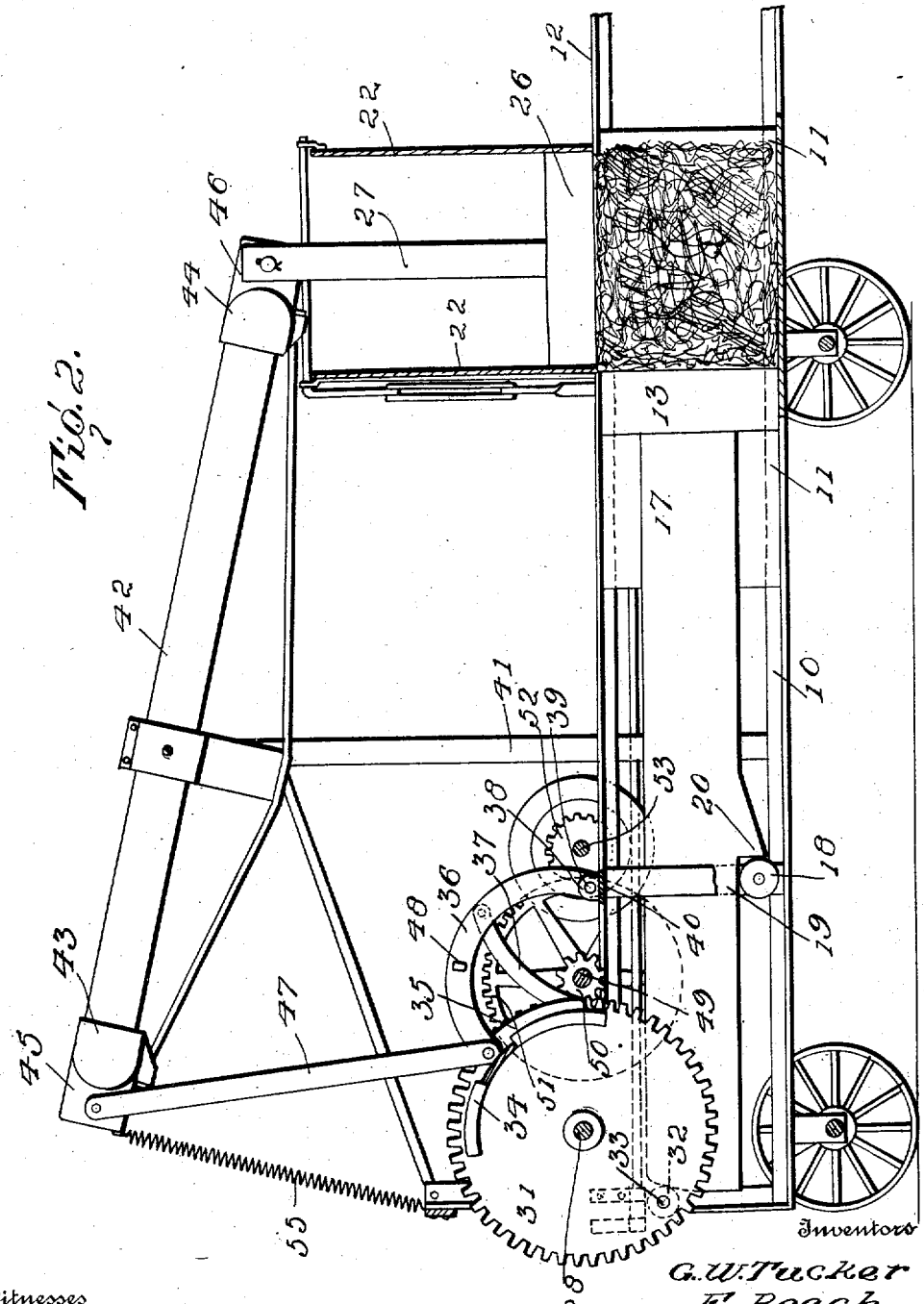

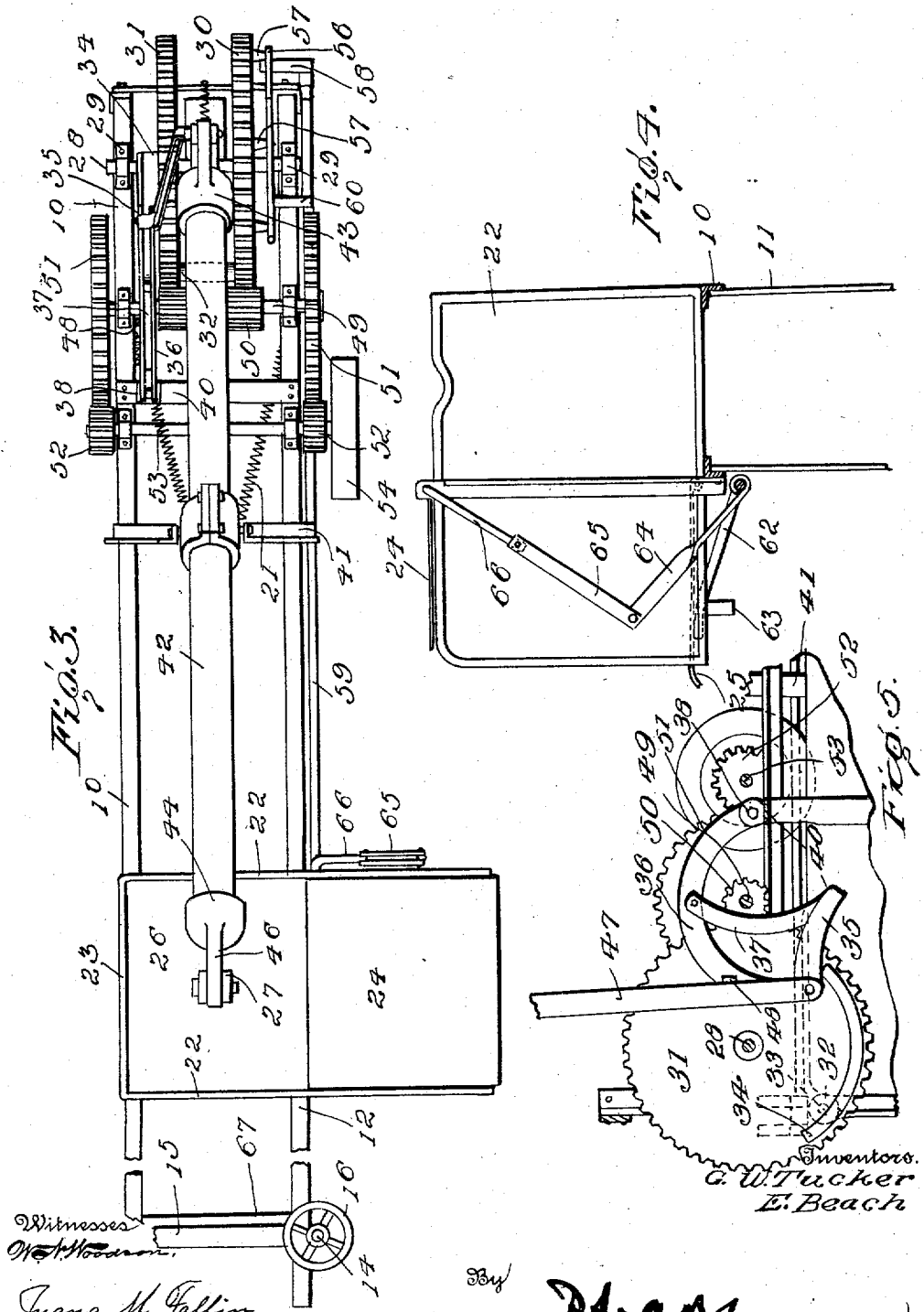

GEORGE W. TUCKER AND EDWARD BEACH, OF VERNON, KANSAS; SAID BEACH ASSIGNOR TO SAID TUCKER.

HAY-PRESS.

969,677.

Specification of Letters Patent.

Patented Sept. 6, 1910.

Application filed December 17, 1909. Serial No. 533,675.

*To all whom it may concern:*

Be it known that we, GEORGE W. TUCKER and EDWARD BEACH, citizens of the United States, both residing at Vernon, in the county of Woodson and State of Kansas, have invented certain new and useful Improvements in Hay-Presses, of which the following is a specification.

This invention relates to hay presses and refers particularly to an improved mechanism for feeding the hay to the press box and for then compressing the same.

An object of this invention is to provide a machine of this character with an improved mechanism whereby the hay is fed automatically to the press box and then compressed into bales by the expenditure of but a comparatively small amount of power.

The invention further contemplates the arrangement of the mechanism with respect to the compressing and feeding devices wherein but few operative parts are employed for the action of the machine, and wherein a great leverage is obtained so as to enable the employment of but a small amount of power.

For a full understanding of the invention reference is to be had to the following description and accompanying drawings, in which:—

Figure 1 is a side elevation of the hay press in position for receiving a quantity of hay to the hopper thereof. Fig. 2 is an opposite side elevation partly in section disclosing the feeding plunger in a downward position after having forced a quantity of hay into the press-box. Fig. 2 is a top plan view of the machine. Fig. 4 is a transverse section through the machine inwardly of the press box. Fig. 5 is a detail, showing a side elevation of the operating mechanism with the flange in position about to engage the shoe.

Corresponding and like parts are referred to in the following description and indicated in all the views of the accompanying drawings by the same reference characters.

Referring to the drawings the numeral 10 designates a frame which is preferably composed of four longitudinal beams which are suitably braced and spaced apart for the reception of the mechanism hereinafter described. The inner end of the frame 10 is provided with a press box 11 which comprises the continuation of the frame 10 having oppositely disposed sideboards for forming a closure which constitutes a press box. Rearwardly of the press box 11, guides 12 are positioned which form continuations of the upper and lower walls of the press box 11 and which receive the bales as they are forced outwardly therebetween by the main plunger 13. The outer extremities of the guides 12 are held in spaced relation by the provision of a bar 14 which is looped about the lower guide and extended upwardly against the opposite flanges of the upper guide 12 where the bar 14 supports a brace 15 which is loosely engaged at its opposite ends over the upper extremities of the bale and held rigidly thereagainst by the provision of clamping nuts 16. The plunger 13, which operates within the press box 11 and longitudinally within the frame 10, is disposed upon the forward end of a beam 17 which extends forwardly from the press box 11 centrally through the frame 10 and is rested upon a roller 18. The roller 18 is mounted in the lower end of a bracket 19 which is centrally disposed within the frame 10 and forms a stop for the beam 17 by engagement with a shoulder 20 which is formed upon the under side of the beam 17. The beam 17 is provided at its opposite sides with coil springs 21 which are engaged at their opposite ends against the opposite sides of the beam 17 and to the side bars of the frame 10 forwardly of the roller 18. These springs are employed for the purpose of holding the plunger 13 in a normal outward position.

Arranged over the press box 11 is a hopper for the reception of hay before the same is compressed, the hopper including a pair of side plates 22 which are provided with a back 23 to engage three sides of the hopper, and at its opposite side with a pair of hinged leaves 24 and 25. The leaves 24 and 25 are pivotally mounted at the upper and lower edges respectively of the hopper, while the sides 22 are extended laterally from the machine to a considerable distance in order to form a hopper for the reception of the hay in conjunction with the leaves 24 and 25. Arranged within the hopper is a feeding plunger 26 which is provided with a stem 27 extended upwardly therefrom and through the upper open end of the hopper which is adapted to reciprocate and to force downwardly into the press box 11 the hay which is fed beneath the plunger 26 between the sides 22 and the leaves 24 and 25.

In the forward end of the frame 10 the operating mechanism is located which includes a main shaft 28 which is journaled at its opposite ends upon the upper faces of the beams which comprise the frame 10 in suitable boxes 29. Arranged centrally upon the main shaft 28 and in spaced relation thereupon are gears 30 and 31 which are mounted rigidly upon the shaft 28 and rotate in parallel relation with one another. The gears 30 and 31 are further held in rigid relation with one another by the provision of a roller 32 which is mounted upon a cross-pin 33 and which serves as an abutment for engagement against the forward beveled edge of the beam 17 in order to throw the same forwardly and intermittently against the tension of the springs 21. The gear 31 is provided upon its outer face with an arcuate flange 34 which forms a channel in conjunction with the gear 31 for the reception of a shoe 35. The shoe 35 is formed of a pair of arcuate strips 36 which are secured in registered relation with one another and which are provided between their outer ends with the engaging strip or main portion of the shoe 35, the latter being held from movement by the provision of a suitable brace 37. The brace 37 is slightly curved throughout its length and extends from the lower end of the shoe 35 to a point intermediately of the lengths of the arcuate strips 36 where it is secured therebetween. The lower or inner ends of the arcuate strips 36 are pivotally secured between a pair of lugs 38 upon a pivot pin 39. The lugs 38 are upwardly extended from a cross-brace 40 which is disposed upon the upper side of the frame 10.

The frame 10 is provided at its central portion and at its opposite sides with a standard which comprises a pair of angle-beams 41 which are extended upwardly from the sides of the frame and are converged at their upper ends to engage in pivotal relation therebetween the intermediate portion of a walking beam 42. The walking beam 42 may be constructed in any suitable manner and is disclosed in this case as comprising an elongated tubing having heads 43 and 44 disposed upon the opposite ends thereof which are provided with webs 45 and 46 formed by the flattening of the outer ends of the heads 43 and 44. A connecting rod 47 is depended from the web 45 of the head 43 and is offset with respect to the outer ends of the arcuate strips 36 and the shoe 35 to which the lower end of the connecting rod 47 is secured. The connecting rod 47 is formed of a pair of bars which are engaged against the opposite sides of the web 45 and the shoe 35 and which are so spaced as to accommodate the strips 36 during the downward movement of the shoe 35 in order to provide a means for checking the downward movement of the shoe 35. The strips 36 are provided with an abutment 48 which strikes the inner edge of the connecting rod 47 and limits the downward movement of the same. The opposite end of the walking beam 42 is pivotally secured to the upper end of the stem 27 which carries the feeding plunger 26.

The means employed for operating the main shaft 28 comprises the provision of a jack-shaft 49 which is transversely disposed across the upper portion of the frame 10 in parallel relation and adjacent to the main shaft 28. A pair of pinions 50 are keyed to the central portion of the jack-shaft 49 and meshed with the teeth of the gears 30 and 31 to impart rotation thereto. The opposite ends of the jack-shaft 49 are extended beyond the frame 10 and carry thereon in rigid relation a pair of gear wheels 51. The gear wheels 51 in turn mesh with a second pair of pinions 52 which are carried upon the opposite ends of a power-shaft 53 which is mounted transversely in the frame 10 forwardly of the cross-bar 40. One extremity of the power-shaft 53 is extended beyond the side of the frame 10 and the pinion 52 to carry a suitable pulley 54 through the medium of which power is transmitted to the mechanism.

For the purpose of drawing the forward end of the walking beam 42 into a downward position upon the release of the shoe 35 by the flange 34, a spring 55 is employed which is disposed between the upper forward end of the frame 10 and the forward extremity of the walking beam 42. The gear 30 is provided upon its outer face with a trip 56 which is of arcuate formation and which is spaced outwardly from the gear 30 by the provision of a plurality of arms 57 which are carried by the gear 30 and engaged with the strip 56, the strip 56 being provided for the purpose of engaging against a finger 58 which is inwardly extended from the forward end of a rod 59. The rod 59 is provided adjacent its forward end with an inwardly extended arm 60 which is so curved as to dispose the inner end thereof in the path of the trip 56. The rod 59 extends longitudinally against the side of the frame 10 and terminates at a short distance beyond a supporting bracket 61 which is disposed beneath the hopper and which carries at its rear extremity an arm 62 which is bent outwardly at right angles to the rod 59 and loosely engaged within a strap 63 carried against the outer face of the lower leaf 25. In this manner the arm 62 regulates the swinging of the leaf 25. The rod 59 is provided with a second arm 64 which is extended upwardly and outwardly therefrom and carries at its outer end a pair of links 65 which are mounted in pivotal relation upon the lower end of a down-turned shaft 66 which is rotatably disposed across the upper edges of the sides 22 of the hopper. The shaft 66 carries in rigid relation therewith and centrally thereon the upper leaf 24.

The outer end of the frame 10 which is formed into the guides 12 is provided with a suitable block 67 which receives thereagainst the bales of hay as they are fed outwardly from the press box 11 by the plunger 13.

The operation of the machine is as follows:—When the mechanism is adjusted as is disclosed in Figs. 1 and 5, namely, wherein the gears 30 and 31 are so turned that the flange 34 is at the lower portion of the wheel 31 and below the shaft 28, and is disengaged from the shoe 35, the outer end of the walking beam 42 is depressed by the tension of the spring 55 in order to raise the feeding plunger 26 into the upper end of the hopper; in this adjustment the roller 32 is carried upwardly past the forward end of the beam 17 so as to release the same and to cause the plunger 13 to be held outwardly of the press box 11 under the action of the springs 21. At the same time the trip 56 is so disposed that it strikes the arm 60 and throws the rod 59 to swing the arms 62 and 64 outwardly to open the side of the hopper by swinging the leaves 24 and 25 outwardly therefrom. It is thus observed that a clear passage is formed to the press box 11 through the hopper, and that a quantity of hay placed in the hopper is compressed by the leaves 24 and 25 when the power shaft 53 is set in motion. The power-shaft 53 carries therewith the pinions 52 which rotate the gear wheels 51 and carry therewith the jack-shaft 49. As the pinions 50 are keyed to the jack-shaft 49, the main gears 30 and 31, which are meshed with the pinions 50, are set in motion. This action carries the mechanism into the adjustment which is disclosed in Fig. 2, wherein the gear 31 is revolved to bring the flange 34 into an upward position for engagement against the shoe 35 and to thereby raise the same. The upward movement of the shoe 35 causes the connecting rod 47 to rise and to swing the walking beam 42 into an opposite position to that disclosed in Fig. 1. The movement of the walking beam 42 forces the stem 27 and the plunger 26 downwardly through the hopper, forcing the hay which has been compressed therein into the feed-box 11. Prior to this downward movement of the plunger 26 the trip 56 strikes the finger 58 and forces the same into a downward position whereupon the rod 59 is rotated and caused to carry the arms 62 and 64 upwardly to swing the leaves 24 and 25 inwardly in overlapped relation with one another. This completely closes the side of the hopper and prevents the forcing of the hay outwardly through the same. As the sides 22 extend laterally from the hopper and the edges of the leaves 24 and 25 fit snugly thereagainst, the passage of the hay is prevented therebetween during the movement of the leaves 24 and 25 or of the plunger 26. Further movement of the gears 30 and 31 causes the roller 32, which is disposed between the gears 30 and 31, to engage against the forward extremity of the beam 17 and to force the same backwardly against the tension of the springs 21 to feed the plunger 13 into the press box 11. When the gears 30 and 31 are rotated the roller 32 travels rearwardly and carries therewith the beam 17 until the path of the roller 32 carries the same upwardly from the end of the beam 17, whereupon the beam is released and the springs 21 return the same to its normal position.

The shoulder 20 which is formed upon the beam 17 provides a suitable stop in conjunction with the roller 18 to limit the forward movement of the beam 17 under the action of the springs 21. During the forward movement of the plunger 13 the flange 34 owing to its predetermined length holds the shoe 35 in an upward position and retains the feeding plunger 26 in the lower end of the hopper, to thereby form the upper wall of the press box 11. The hay is thereby compressed within the box 11 and forced outwardly between the guides 12 against the block 67. The plunger 13 is now released and is drawn into a forward position when the shoe 35 is released from the flange 34 and the plunger 36 is raised under the tension of the spring 55. The leaves 24 and 25 are now swung into an open position by the striking of the trip 56 against the arm 60. The machine is now in a position to receive a second quantity of hay which is to be compressed.

Having thus described the invention what is claimed as new is:—

1. The combination of a press box, a plunger for the press box, a hopper mounted to discharge into the press box and formed with a swinging side, a frame, gears mounted upon the frame, a roller carried between said gears and serving to actuate the plunger, a trip upon one of said gears, and means actuated by the trip for moving the swinging side of the hopper upward before the plunger is operated.

2. The combination of a press box, a main plunger for the press box, a hopper mounted to feed into the press box, a second plunger for the hopper, a walking beam having the second plunger connected to one end thereof, a frame, gears mounted upon the frame, a roller carried between said gears and serving to actuate the main plunger, a trip upon one of said gears and means actuated by the trip for moving the walking beam and operating the second plunger within the hopper before the main plunger is operated within the press box.

3. A hay press including a longitudinal frame, a press box mounted at one end of said frame, a hopper carried by said frame over said press box, a plunger carried by said frame for reciprocation within said press box, a beam carried by said plunger and extended longitudinally within said frame, gears located on said frame a roller disposed between said gears for engagement with the outer extremity of said beam, a flange disposed upon one of said gears, a shoe pivotally mounted upon said frame for engagement over said flange at times, a walking beam carried by said frame and pivotally connected at one end to said shoe, and a plunger located in said hopper and connected to the opposite end of said walking beam to be actuated thereby.

4. A hay press including a frame, a press box formed at one end of said frame, a hopper mounted on said frame to discharge into said press box, a pair of gears located in the opposite end of said frame, a roller disposed between said gears adjacent the peripheries thereof, a beam slidably disposed within said frame and in the path of said roller, a plunger formed upon the inner end of said beam for reciprocation in said press box, a shoe pivotally disposed upon said frame adjacent one of said gears, a flange formed upon the outer face of said gear for intermittent engagement with said shoe, a walking beam located on said frame, a connecting rod disposed between said shoe and said walking beam for reciprocating the latter, and a plunger carried by the opposite end of said walking beam for reciprocation within said hopper.

5. A baling press including a press-box, a hopper communicating with the press-box to discharge thereinto, plungers arranged for reciprocation within the press-box and the hopper, operating means engaging with the plungers for moving the plunger in the hopper downwardly and subsequently moving the plunger in the press box into the press-box, said operating means retaining the plunger in the hopper fixedly in a downward position during the inward movement of the plunger in the press-box.

6. A hay press including a frame, a press box formed on said frame, a plunger mounted in said press box, a beam carried by said plunger and longitudinally disposed in said frame, a pair of gears mounted in said frame, a roller carried between said gears adjacent the peripheries thereof and in the path of the forward end of said beam, a hopper formed on said frame to discharge into said press box, a plunger located in said hopper, a walking beam connected at one end to said plunger in said hopper, a connecting rod depended from the opposite end of said beam adjacent said gears, a shoe pivotally mounted on said frame and connected at its outer end to the lower extremity of said connecting rod, a flange formed upon the outer face of the adjacent of said gears for engagement with said shoe, and means disposed upon said frame for actuating said gears.

7. A hay press including a frame, a press box on said frame, a hopper located on said frame to discharge into said press box, gears located on said frame, plungers arranged in said press box and said hopper engaging with said gears, leaves hingedly disposed at one side of said hopper, arms connected to said leaves, a rod for supporting said arms and arranged longitudinally upon the frame, a finger inwardly extended from one end of said rod adjacent said gears and a trip carried by the adjacent of said gears for engagement with said finger at times.

8. A baling press including a press box, a main plunger for the press box, a hopper arranged to discharge into the press box and having a swinging side, a second plunger located in the hopper to form a closure for the press box, and an operating mechanism engaging with the plungers, and to the swinging side for holding the second plunger and the swinging side in a closed position during the inward movement of said first plunger.

9. A baling press including a frame, a press box on the frame, a main plunger for the press box, a hopper carried by the frame to discharge into the press box, hinged leaves mounted at the side of the hopper to close the same, a feeding plunger arranged within the hopper to form a closure for the press box, and an operating mechanism carried by the frame adapted to consecutively close the hinged leaves, move the second plunger inwardly to close the press box, and to move the main plunger into the press box, said mechanism being adapted to hold the second plunger in an inward position during the compressing action of said first plunger.

10. A baling press including a press box, a main plunger for reciprocation within the press box, a hopper arranged over the press box to discharge thereinto, a feeding plunger located within the hopper, and an operating mechanism engaging with said plungers to move said feeding plunger downward and to hold the same rigidly in such position during the inward movement of said main plunger.

11. A baling press including a press box, a hopper connecting with the press box and having hinged leaves constituting one wall thereof to receive compressible material, a feeding plunger in the hopper constituting a second wall thereof and a closure for the press box, a main plunger within the press box, and an operating mechanism carried by the press adapted to close the leaves and to hold the feeding plunger inwardly during the compressing action of said main plunger.

12. A baling press including a frame, a press box at one end of the frame, a hopper carried by the frame and discharging into the press box, a plunger arranged within the press box for longitudinal movement in the frame, a feeding plunger carried in the hopper for vertical movement over the frame, a standard carried upon the frame midway of its ends, a walking beam pivoted upon the upper end of the standard and having one end thereof connected to said feeding plunger, a pair of companion gears arranged in the opposite end of the frame, a roller carried between the gears and adjacent their peripheries, a beam carried in the frame for reciprocating said main plunger and adapted for intermittent engagement with the roller, a lateral flange carried by one of the gears, a hinged shoe carried by the frame for intermittent engagement with the flange, a connecting rod arranged between the free end of the walking beam and the outer end of the shoe to rock the walking beam, and means for actuating said gears.

13. A baling press including a frame, a walking beam arranged above the frame, a press box disposed upon one end of the frame beneath the walking beam, a hopper carried by the frame to discharge into the press box, a feeding plunger carried by the walking beam for reciprocation within the hopper, a shoe hinged upon the opposite end of the frame, a connecting rod disposed between the free end of the walking beam and the outer end of the shoe, companion gears carried in the frame adjacent said shoe, an elongated arcuate flange arranged at one side of one of said gears to raise said shoe and to hold the same in such position, a roller disposed between the companion gears, and a main plunger arranged in the frame to reciprocate within the press box and for intermittent engagement with said roller.

14. A baling press including a frame, a press box on the frame, a hopper carried by the frame to discharge into the press box, a feeding plunger carried in the hopper, a pair of hinged leaves carried at one side of the hopper for closing the same, and an operating mechanism located on the frame for closing said leaves and for subsequently moving said feeding plunger inwardly to discharge a quantity of compressible material in said feeding box.

15. A baling press including a frame, a press box carried by the frame, a main plunger disposed in the frame for operation in the press box, a hopper carried by the frame to discharge into the press box, a feeding plunger arranged within the hopper, said hopper having a pair of hinged and overlapping leaves constituting one side thereof, and an operating mechanism carried by the frame for consecutively closing the leaves and moving the feeding plunger inwardly, and to retain the feeding plunger in an inward position during the compressing action of said main plunger.

In testimony whereof we affix our signatures in presence of two witnesses.

GEORGE W. TUCKER. [L. S.]
EDWARD BEACH. [L. S.]

Witnesses:
F. L. STEPHENSON,
JNO. H. GUNNELS.